(12) United States Patent
Martin et al.

(10) Patent No.: US 9,608,456 B2
(45) Date of Patent: Mar. 28, 2017

(54) METHOD FOR ESTIMATING THE SELF-DISCHARGE OF A LITHIUM BATTERY

(75) Inventors: Nelly Martin, Montaud (FR); Frederic Le Cras, Villenave d'Ornon (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 207 days.

(21) Appl. No.: 13/980,132

(22) PCT Filed: Jan. 20, 2012

(86) PCT No.: PCT/FR2012/000028
§ 371 (c)(1),
(2), (4) Date: Oct. 25, 2013

(87) PCT Pub. No.: WO2012/098316
PCT Pub. Date: Jul. 26, 2012

(65) Prior Publication Data
US 2014/0049227 A1    Feb. 20, 2014

(30) Foreign Application Priority Data
Jan. 20, 2011  (FR) .................................... 11 00174

(51) Int. Cl.
| | | |
|---|---|---|
| H02J 7/16 | (2006.01) | |
| H02J 7/04 | (2006.01) | |
| H02J 7/00 | (2006.01) | |
| H01M 10/0525 | (2010.01) | |
| H01M 10/42 | (2006.01) | |
| H01M 10/44 | (2006.01) | |
| H01M 6/50 | (2006.01) | |

(52) U.S. Cl.
CPC ........... *H02J 7/00* (2013.01); *H01M 10/0525* (2013.01); *H01M 10/4285* (2013.01); *H01M 10/44* (2013.01); *H01M 6/5088* (2013.01); *H01M 10/446* (2013.01); *Y02P 70/54* (2015.11)

(58) Field of Classification Search
CPC ........... Y02E 60/12; H02J 7/14; H02J 7/0068; H01M 10/441; H01M 10/44
USPC ......................................................... 320/162
See application file for complete search history.

(56) References Cited

U.S. PATENT DOCUMENTS

| | | | |
|---|---|---|---|
| 5,162,170 A * | 11/1992 | Miyabayashi et al. | 429/94 |
| 6,040,685 A * | 3/2000 | Tsenter et al. | 320/160 |
| 6,436,576 B1 * | 8/2002 | Hossain | C04B 35/83 429/231.2 |
| 2004/0023117 A1 * | 2/2004 | Imachi et al. | 429/231.95 |
| 2004/0128086 A1 * | 7/2004 | Barsoukov et al. | 702/63 |
| 2005/0008940 A1 * | 1/2005 | Adachi | H01M 4/133 429/327 |
| 2006/0008705 A1 * | 1/2006 | Iijima | H01M 4/13 429/231.95 |
| 2007/0082264 A1 | 4/2007 | Mikhaylik | |
| 2011/0065006 A1 * | 3/2011 | Ogasa | H01M 4/0471 429/319 |

FOREIGN PATENT DOCUMENTS

| | | |
|---|---|---|
| JP | A-2002-343446 | 11/2002 |
| JP | A-2003-100351 | 4/2003 |
| JP | A-2003-317810 | 11/2003 |

* cited by examiner

*Primary Examiner* — Arun Williams
(74) *Attorney, Agent, or Firm* — Oliff PLC

(57) ABSTRACT

A method for determining the self-discharge current of a lithium-ion battery provided with a positive electrode, a negative electrode, and an electrolyte arranged between the positive and negative electrodes includes charging the battery until a metal lithium layer is formed between the electrolyte and the negative electrode, measuring the open-circuit voltage of the battery at two moments, and determining the self-discharge current from the variation of the voltage measured between the two moments.

16 Claims, 3 Drawing Sheets

METHOD FOR ESTIMATING THE SELF-DISCHARGE OF A LITHIUM BATTERY

BACKGROUND OF THE INVENTION

The invention relates to a method for estimating the self-discharge of a lithium battery by measuring the open-circuit voltage of the battery.

STATE OF THE ART

FIG. 1 shows a conventional lithium battery architecture. The lithium battery successively comprises a positive electrode 2, an electrolyte 4, and a negative electrode 6. The operating principle relies on the insertion-deinsertion (or intercalation-deintercalation) of a lithium ion $Li^+$ in positive electrode 2. The material of the positive electrode is then called lithium insertion material.

The positive electrode comprises an ionic conductor and electronic conductor insertion material, for example, titanium oxysulfide (TiOS). The electrolyte is an electric insulator having high ion conductivity such as lithium phosphorus oxynitride (LiPON). The nature of the negative electrode varies according to the category of the battery.

In lithium-ion batteries, negative electrode 6 also comprises an insertion material. The $Li^+$ ions travel back and forth between electrodes 2 and 6 for each charge and discharge of the battery. The insertion material of electrode 6 is generally selected from among transition metal oxides ($LiNiO_2$, SnO, indium lead oxide . . . ) and simple elements (Si, Ge, C . . . ).

FIG. 2 schematically represents the operation of a lithium-ion $Li_xTiOS/LiPON/Si$ battery during a charge. Electrons flow from the positive LiTiOS electrode to the negative Si electrode via an external electric circuit and $Li^+$ ions migrate from the positive electrode to the negative electrode through the electrolyte. The charge half-reactions are written as follows:

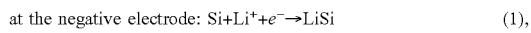

at the negative electrode: $Si+Li^++e^- \rightarrow LiSi$  (1),

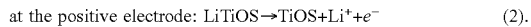

at the positive electrode: $LiTiOS \rightarrow TiOS+Li^++e^-$  (2).

The $Li^+$ ion depletion of the positive electrode causes an increase in its electric potential. Conversely, since the negative electrode is charged with $Li^+$ ions, its potential decreases. This results in an increase of the battery voltage.

Actually, the voltage of a battery corresponds to the difference between the potential at the positive electrode/electrolyte and electrolyte/negative electrode interfaces. These potentials vary according to the quantity of $Li^+$ ions present at the interfaces.

When a fully-charged battery is placed in open circuit, a progressive drop of the voltage at the terminals of the battery can be observed. This decrease is due, on the one hand, to the relaxation of the battery, and on the other hand to its self-discharge.

The relaxation phenomenon especially comprises the balancing of the $Li^+$ concentrations inside of the electrode materials after a charge. This phenomenon is described hereafter in relation with the $Li_xTiOS/LiPON/Si$ battery of FIG. 2.

The curves to the right of FIG. 2 show the lithium ion concentration gradient $X_{Li}$ within the positive electrode (lower curve) and within the negative electrode (upper curve), before (solid lines) and after (dotted lines) relaxation of the battery.

During the charge, the $Li^+$ ions insert into the negative Si electrode at the interface with the LiPON electrolyte. Quantity $X_{Li}$ is thus initially higher at the level of this interface than in the rest of the silicon, as shown by the upper curve in solid line. After the charge, $Li^+$ ions keep on diffusing through the silicon. Quantity $X_{Li}$ then tends to homogenize in the electrode material (upper curve in dotted lines).

Conversely, the $Li_xTiOS/LiPON$ interface is depleted of $Li^+$ ions more rapidly than the rest of the positive electrode during the charge. The lower curve in solid line shows that the quantity of $Li^+$ ions is lower at the interface. $Li^+$ ions then diffuse towards the interface to balance quantity $X_{Li}$ in the positive electrode (lower curve in dotted lines).

The voltage drop associated with the battery relaxation can then be explained by variations of the quantity of $Li^+$ ions at the interfaces with the electrolyte.

The self-discharge of the battery corresponds to the implementation of parasitic electrochemical reactions at the electrodes and/or to the transfer of electrons from one electrode to the other due to construction defects and/or to the electronic conductivity of the electrolyte. Such a self-discharge is significant for conventional aqueous electrolyte batteries. However, in lithium batteries, the use of a solid electrolyte limits parasitic reactions. The electron current through the electrolyte is extremely low given the high electric resistivity of UPON. The self-discharge levels are low, which makes them difficult to determine.

The self-discharge of lithium batteries is conventionally estimated by measuring the decrease of open-circuit voltage $V_{CO}$ of the battery along time. However, such a decrease is also due to the battery relaxation, as previously described. It is thus necessary to wait for a sufficiently long time period so that the battery has relaxed. After this relaxation time, the decrease of voltage $V_{CO}$ corresponds to the self-discharge.

Actually, the relaxation time depends on the lithium diffusion coefficients in the electrode materials. At ambient temperature, this coefficient is high for positive electrode materials, approximately ranging between $10^{-11}$ and $10^{-9}$ $cm^2 \cdot s^{-1}$, but low for negative electrode materials such as silicon, from $10^{-15}$ to $10^{-14}$ $cm^2 \cdot s^{-1}$. The profile of quantity $X_{Li}$ in the negative electrode thus varies slowly, which explains relaxation times of several hours, or even of several hundreds of hours.

FIG. 3 represents for example purposes open-circuit voltage $V_{CO}$ after a nominal charge at 2.6 V of the battery of FIG. 2. It can be observed that the slope of the curve still varies 3 hours after the end of the charge. This means that the relaxation is still not finished.

This waiting time considerably lengthens the time for estimating self-discharge. Such a technique is thus difficult to apply at a large scale, especially in the context of lithium-ion battery quality controls.

The self-discharge, expressed by a voltage decrease per unit time, may also be called battery leakage current.

The self-discharge necessarily induces a decrease in the battery useful capacity. Another estimation technique consists in charging the battery, storing it in the charged state for a predetermined time period and discharging it at constant current down to a threshold voltage. The variation of the capacity released during discharge then enables to calculate the nominal capacity loss per unit time, that is, the self-discharge. This technique also requires a significant storage time during which the battery relaxation takes place.

SUMMARY OF THE INVENTION

A need therefore exists to provide a simple and fast method for determining the self-discharge current of a lithium-ion battery provided with a positive electrode, a negative electrode comprising a lithium ion insertion material, and an electrolyte arranged between the positive and negative electrodes.

This need tends to be satisfied by charging the battery until a metal lithium layer is formed between the electrolyte and the negative electrode, by measuring the open-circuit voltage of the battery at two moments, and by determining the self-discharge current from the variation of the voltage measured between the two moments.

According to an embodiment, the positive electrode comprises a quantity of lithium greater than the quantity of lithium that the negative electrode is capable of inserting.

According to an alternative embodiment, the charge parameters are selected to cause a lithium ion flow greater than the maximum ion flow capable of diffusing within the negative electrode.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

It is here provided to shorten the self-discharge estimation time by decreasing the time required for the battery relaxation. To achieve this, the battery is charged until a metal lithium layer forms on the negative electrode. This metal layer, at the negative electrode/electrolyte interface, enables to set the potential of the negative electrode. Thus, the relaxation time only depends on the lithium diffusion in the positive electrode. The diffusion being faster in the positive electrode than in the negative electrode, the relaxation is more rapidly reached. The self-discharge current or leakage current of the battery is then determined by measuring the open-circuit voltage.

Figure 1:
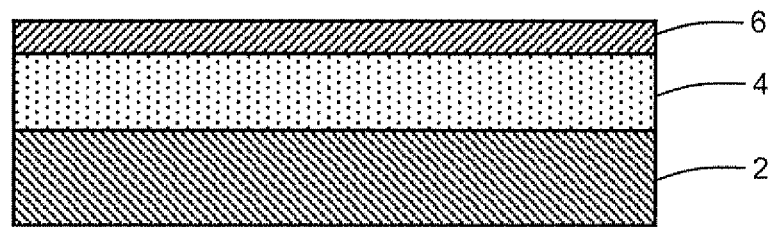
FIG. 1, previously described, represents a conventional lithium battery architecture.
Figure 2:
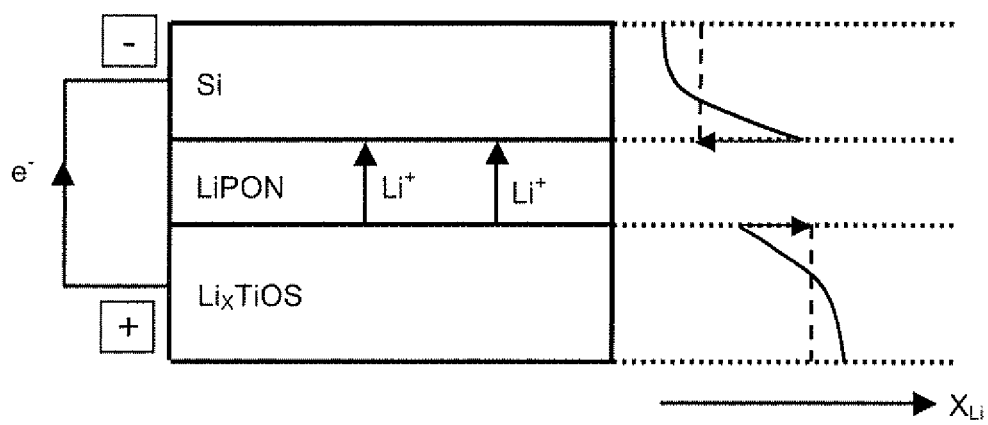
FIG. 2, previously described, schematically represents the operation in charge mode of a $Li_xTiOS/LiPON/Si$ battery and the lithium ion concentration gradient $X_{Li}$ in the electrodes, before and after relaxation of the battery.

A lithium-ion battery comprising a positive electrode 2, a negative electrode 6, and an electrolyte 4 arranged between electrodes 2 and 6 is first provided, as illustrated in FIG. 1. Electrodes 2 and 6 comprise a lithium ion insertion material, for example, TiOS for positive electrode 2 and Si for negative electrode 6. Further, at least one of these two materials is lithiated, that is, contains lithium. Lithium is for example incorporated into the positive electrode ($Li_xTiOS$) during the manufacturing of the battery. The electrolyte preferably is of solid type, for example, LiPON.

Figure 4:
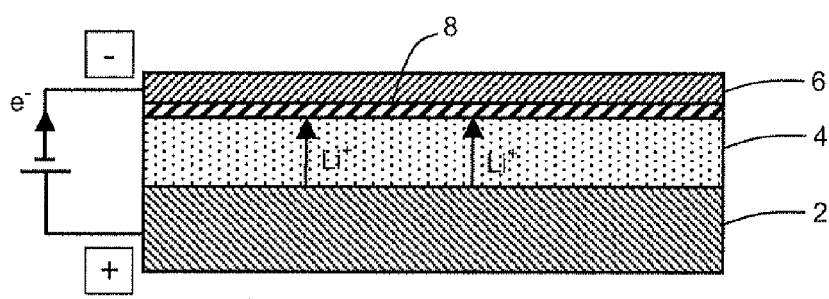
FIG. 4 represents the charge of a lithium-ion battery until a metal electrode forms, enabling to rapidly determine the battery leakage current.

In FIG. 4, the lithium-ion battery is charged until a metal lithium layer 8 forms between electrolyte 4 and negative electrode 6.

In a preferred embodiment, metal layer 8 is formed by a full charge of the battery, the battery being imbalanced in terms of lithium ion insertion capacity. This means that positive electrode 2 initially contains more $Li^+$ ions than negative electrode 6 can store.

During the charge, the $Li^+$ ions originating from electrode 2 insert into electrode 6 until saturation thereof. Then, the $Li^+$ ions of electrode 2, in excess with respect to the capacity of electrode 6, are electrodeposited on the surface of electrode 6, thus forming layer 8.

Figure 5:
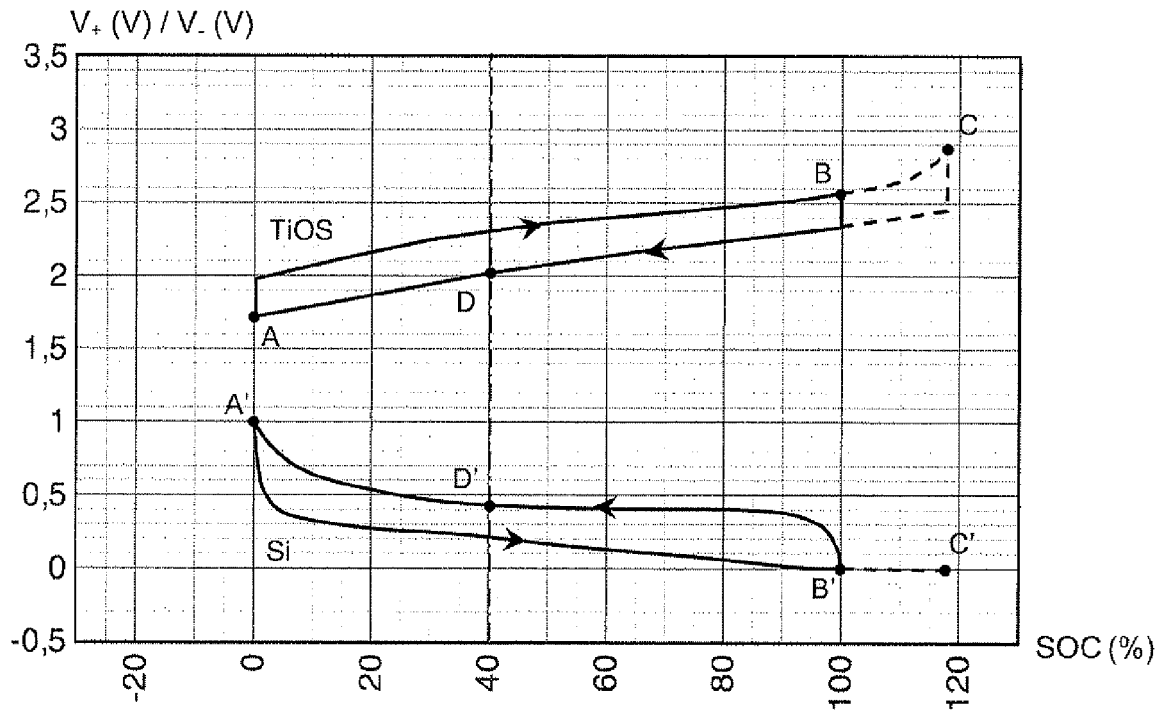
FIG. 5 represents potential $V_+$ of the positive electrode and potential $V_-$ of the negative electrode according to the battery state of charge SOC, in a test charge and a nominal operation cycle.

FIG. 5 represents the variation of potential $V_+$ of the $Li_xTiOS$ electrode and of potential $V_-$ of the Si electrode according to the battery state of charge SOC, in a test charge and a nominal operation cycle.

Points A and A' show the initial state of the electrodes, for example, just after manufacturing of the battery. The battery state of charge SOC is zero, it is thus discharged. The TiOS electrode contains a quantity of lithium corresponding to a potential $V_+$ of 1.7 V with respect to the $Li^+/Li$ reference potential. Conversely, the Si electrode comprises no lithium, its potential is maximum ($V_-=1$ V with respect to the $Li^+/Li$ reference potential).

During the charge, potential $V_+$ increases given that the $Li_xTiOS$ electrode releases $Li^+$ ions. Conversely, potential $V_-$ decreases because the Si electrode charges with $Li^+$ ions.

At B and B', the battery is fully charged (SOC=100%). Voltage $V_+$ is 2.6 V (vs. $Li^+/Li$) and potential $V_-$ reaches 0 V (vs. $Li^+/Li$), which means that the negative electrode is saturated with lithium. Portions AB and A'B' actually correspond to a nominal charge of the battery, that is, a charge in normal operation.

The charge continues beyond points B and B', for example, at C and C' as shown in dotted lines in FIG. 5. Thus, other $Li^+$ ions are extracted from electrode 2. However, they cannot insert into electrode 6 since said electrode is saturated. They are thus electrodeposited at the silicon surface and form metal layer 8. Potential $V_-$ is maintained at 0 V (vs. $Li^+/Li$) while potential $V_+$ keeps on increasing to reach 2.9 V (vs. $Li^+/Li$). Layer 8 then constitutes a reference potential. In the present example, this potential is 0 V (vs. $Li^+/Li$).

The battery is then placed in open circuit and potential $V_{CO}$ at the terminals of the battery is measured. Potential $V_{CO}$ here corresponds to potential $V_+$ of the positive electrode since potential $V_-$ of the negative electrode is zero. When the slope of curve $V_{CO}$ (t) becomes constant, the positive electrode is considered to have reached its balance. The slope, corresponding to a voltage decrease per unit time, then accounts for the battery leakage current. Voltage $V_{CO}$ is measured at two moments, after which the self-discharge current is calculated from the voltage variation between these two moments.

The self-discharge can also be expressed in terms of capacity, by using charts of voltage $V_{CO}$ versus the state of charge, SOC.

After having determined the self-discharge, the battery can be normally used, according to nominal charge and discharge cycles. An operating range defined by a low cut-off voltage DD' (in discharge mode) and a high cut-off voltage BB' (in charge mode) is generally set. The hysteresis observed on the curves of FIG. 5 (voltage jumps at A and B) is due to the internal resistances and to the overvoltages of the reactions.

The high cut-off voltage preferably corresponds to the saturation threshold of the negative electrode (or insertion limit of lithium in the negative electrode), at points B and B' in FIG. 5. The high cut-off voltage for example is $V_{BAT}=V_+(B)-V_-(B')=2.6$ V.

The low cut-off voltage of the battery varies according to the electrode materials and to the device that it powers. Generally, the low cut-off voltage corresponds to a partial discharge of the battery. This means that part of the $Li^+$ ions is immobilized in the silicon electrode. It is for example located at points D and D' of FIG. 5 and is $V_{BAT}=V_+(D)-(D')=1.7$ V. This corresponds to a percentage of immobilized $Li^+$ ions of approximately 23%.

Figure 3:
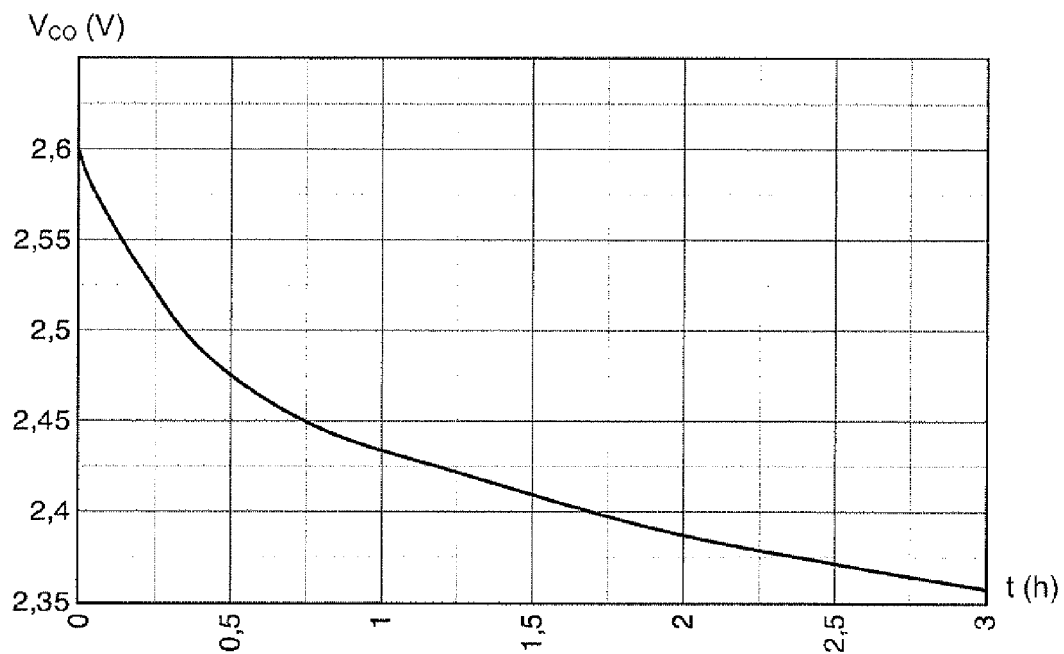
FIG. 3, previously described, represents the variation of open-circuit voltage $V_{CO}$ of the $Li_xTiOS/LiPON/Si$ battery along time after a nominal charge at 2.6 V.
Figure 6:
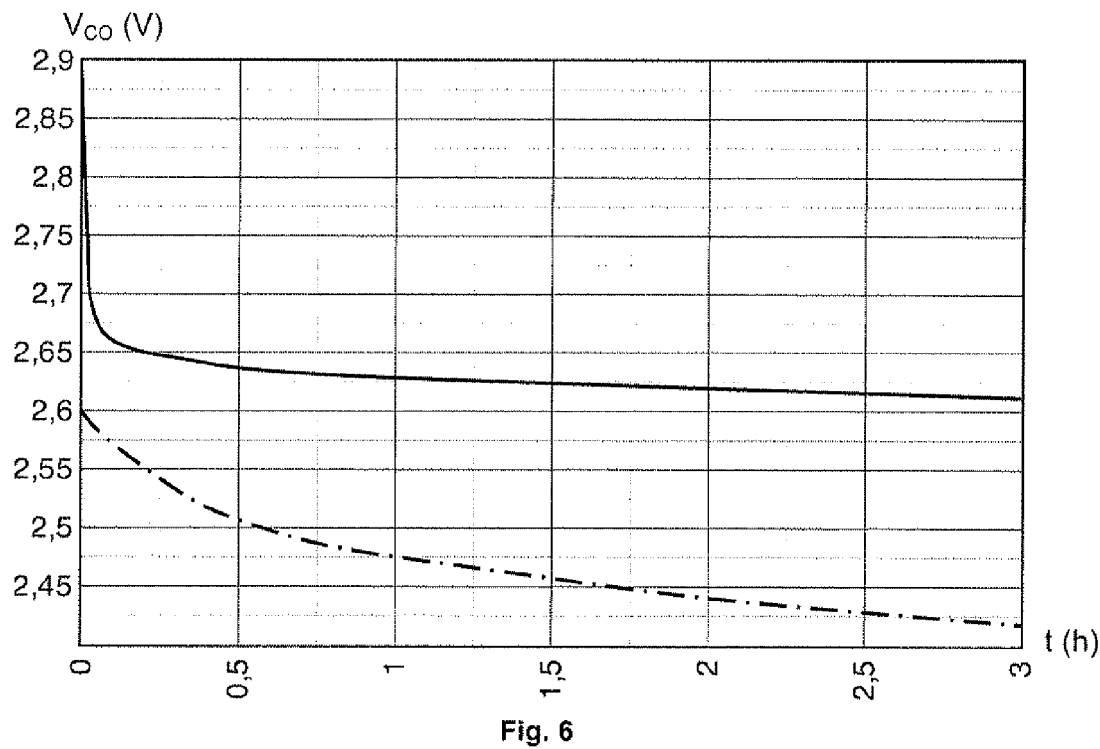
FIG. 6 represents the variation of open-circuit voltage $V_{CO}$ of the battery of FIG. 4 along time.

FIG. 6 represents in solid line open-circuit voltage $V_{CO}$ of the battery of FIG. 4, according to the time elapsed after a charge at 2.9 V. The curve of FIG. 3 has been copied on the diagram in dotted lines, for comparative purposes.

It can be observed that the voltage stabilization occurs much faster in the case of the battery provided with the metal layer. Indeed, the slope of the curve becomes constant after one hour only, while at least three hours are necessary in the case of a nominal charge at 2.6 V. The time for estimating the self-discharge is thus considerably decreased with respect to conventional techniques.

The above-described method for determining the self-discharge current is preferably carried out in the context of quality controls performed immediately after the battery manufacturing. Indeed, the self-discharge current is an important datum to assess the reliability of a battery. The first battery charge is thus used to form the metal lithium layer to rapidly determine its leakage current, after which the battery is normally used.

In an alternative embodiment, the charge parameters are selected so that a significant quantity of $Li^+$ ions is transferred to electrode 6 during a short time period. The flow of $Li^+$ ions from the positive electrode to the negative electrode is then greater than the maximum flow of $Li^+$ ions capable of diffusing within the negative electrode. Since electrode 6 cannot insert such a quantity within such a short time, a metal lithium layer forms at its surface. Potential $V_-$ reaches 0 V (vs. $Li^+/Li$) without for the battery to be totally charged (SOC<100%). In this case, the battery may be balanced in terms of insertion capacity.

In other words, the battery is charged at a sustained rate to saturate the negative electrode at its surface only, by a sufficient quantity to persist during the relaxation time of the positive electrode. The battery is preferably charged at a high constant voltage, for example, at 2.9 V for thirty minutes.

The method for determining the self-discharge current is particularly advantageous for batteries having a negative electrode with a chemical lithium diffusion coefficient smaller than $10^{-9}$ cm$^2$/s.

Many variations and modifications of the method for determining the self-discharge current will occur to those skilled in the art. The method has been described in relation with a LiTiOS/LiPON/Si battery. However, other insertion materials may be used, especially $LiCoO_2$, $LiMn_2O_4$, $LiNi_{0.5}Mn_{1.5}O_4$ for the positive electrode and Si, Al, Ge, SnO, $LiNiO_2$, indium lead oxide for the negative electrode. The voltage values may further vary according to the nature of the electrode materials and to the envisaged application.

The invention claimed is:

1. A method for determining a self-discharge current comprising the steps of:
   providing a lithium-ion battery provided with a positive electrode, a negative electrode comprising a lithium ion insertion material, and a solid type electrolyte arranged between the positive and negative electrodes, the lithium ion insertion material being in direct contact with the solid type electrolyte,
   charging the lithium-ion battery until a metal lithium layer is formed between the solid type electrolyte and the negative electrode,
   measuring the open-circuit voltage of the lithium-ion battery at two moments without connecting the battery between the two moments, and
   determining the self-discharge current from the variation of the measured voltage between the two moments.

2. The method according to claim 1, wherein the positive electrode comprises a quantity of lithium greater than the quantity of lithium that the negative electrode is capable of inserting.

3. The method according to claim 1, wherein the charge parameters are selected to cause a flow of lithium ions greater than the maximum flow of lithium ions capable of diffusing within the negative electrode.

4. The method according to claim 1, wherein the negative electrode comprises a material having a lithium chemical diffusion coefficient smaller than $10^{-9}$ cm$^2$/s.

5. The method according to claim 1, wherein the negative electrode comprises a lithium ion insertion material selected from the group consisting of Si, Al, Ge, SnO, $LiNiO_2$, and indium lead oxide.

6. The method according to claim 1, comprising a full first charging step of the lithium-ion battery configured to saturate the lithium ion insertion material followed by an additional charging step configured to form the metal lithium layer.

7. The method according to claim 1, wherein voltage measurements between two moments are made while the potential of the negative electrode is set to 0.

8. The method according to claim 1, wherein voltage measurements between two moments are achieved when relaxation of Li+ concentration in the positive electrode is reached.

9. A method for determining the self-discharge current of a lithium-ion battery provided with a positive electrode, a negative electrode comprising a lithium ion insertion material, and a solid type electrolyte arranged between the positive and negative electrodes, comprising the steps of:
   providing the lithium-ion battery provided with a positive electrode, a negative electrode comprising a lithium ion insertion material, and a solid type electrolyte arranged between the positive and negative electrodes, the lithium ion insertion material being in direct contact with the solid type electrolyte,
   charging the lithium-ion battery so that a significant quantity of Li+ ions is transferred to the negative electrode during a short time period, until a metal lithium layer is formed between the solid type electrolyte and the negative electrode,
   measuring the open-circuit voltage of the lithium-ion battery at two moments without connecting the battery between the two moments, and
   determining the self-discharge current from the variation of the measured voltage between the two moments.

10. The method according to claim 9, wherein the positive electrode comprises a quantity of lithium greater than the quantity of lithium that the negative electrode is capable of inserting.

11. The method according to claim 9, wherein the charge parameters are selected to cause a flow of lithium ions greater than the maximum flow of lithium ions capable of diffusing within the negative electrode.

12. The method according to claim 9, wherein the negative electrode comprises a material having a lithium chemical diffusion coefficient smaller than $10^{-9}$ cm$^2$/s.

13. The method according to claim 9, wherein the negative electrode comprises a lithium ion insertion material selected from the group consisting of Si, Al, Ge, SnO, LiNiO$_2$ and indium lead oxide.

14. The method according to claim 9, comprising a full first charging step of the lithium-ion battery configured to saturate the lithium ion insertion material followed by an additional charging step configured to form the metal lithium layer.

15. The method according to claim 9, wherein voltage measurements between two moments are made while the potential of the negative electrode is set to 0.

16. The method according to claim 9, wherein voltage measurements between two moments are achieved when relaxation of Li+ concentration in the positive electrode is reached.

* * * * *